Nov. 7, 1961    G. K. EGGERTSSON    3,007,274
TRAWL DOOR

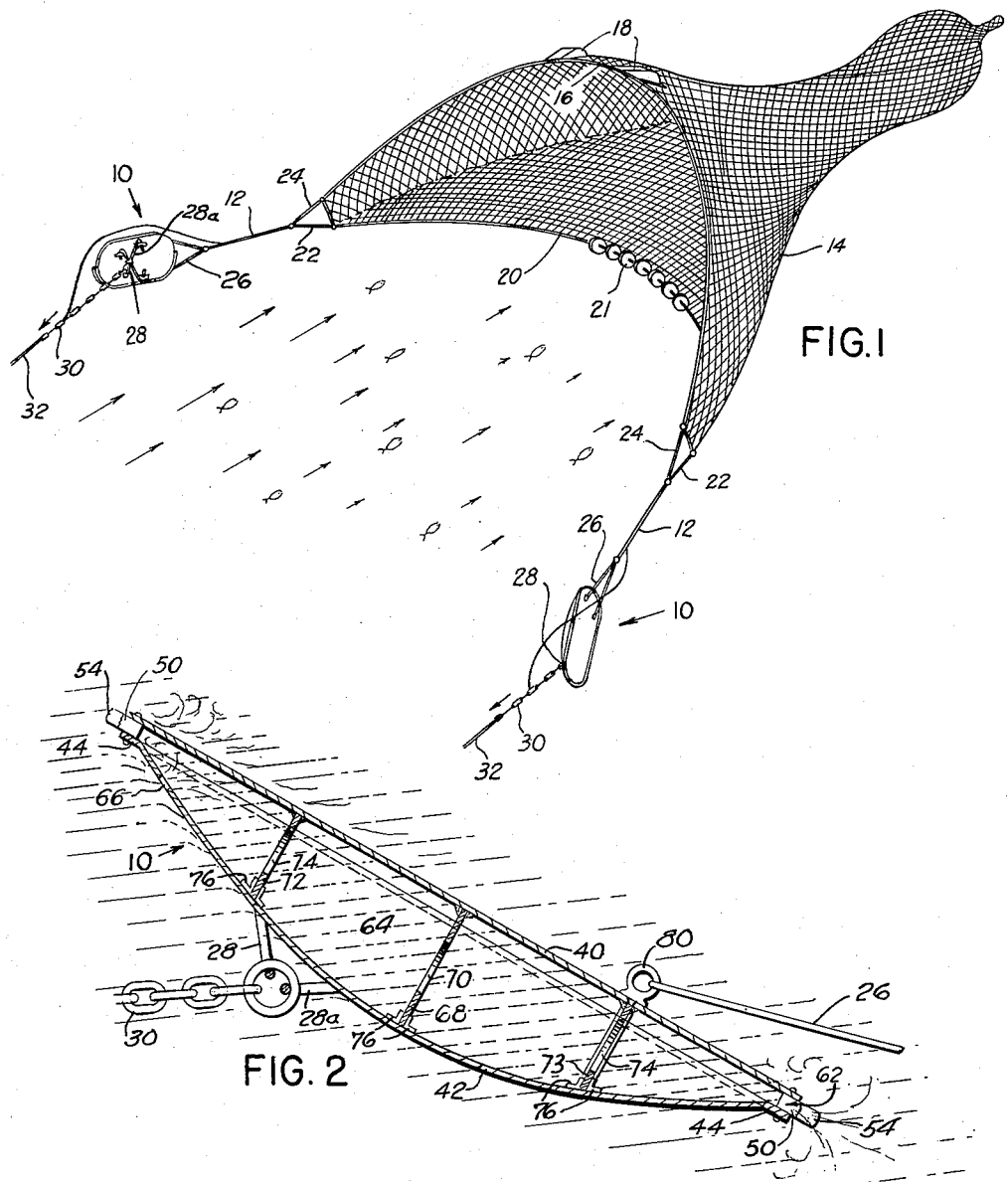

Filed Nov. 17, 1959    2 Sheets-Sheet 2

INVENTOR.
Grimur K. Eggertsson
BY Robert R. Churchill
ATTORNEY

United States Patent Office 3,007,274
Patented Nov. 7, 1961

3,007,274
TRAWL DOOR
Grimur K. Eggertsson, 42 Paine St., Winthrop, Mass.
Filed Nov. 17, 1959, Ser. No. 853,525
13 Claims. (Cl. 43—9)

The invention has for an object to provide a novel and improved trawl door for use in connection with fishing nets characterized by structure enabling it to keep the wings of a trawl net open and to maintain itself in an upright position during the fishing operation and is shaped to reduce friction and drag as it is towed through the water, thereby increasing the efficiency of the fishing operation and substantially reducing the power required to tow the net through the water.

With this general object in view and such others as may hereinafter appear, the invention consists in the trawl door for fishing nets as hereinafter described and particularly defined in the claims at the end of this specification.

In the drawings:

FIG. 1 is a perspective view of a trawl net embodying the present trawl doors;

FIG. 2 is a cross sectional detail view of a trawl door constructed in accordance with the present invention, the section being taken on the line 2—2 of FIG. 3;

Figure 3:
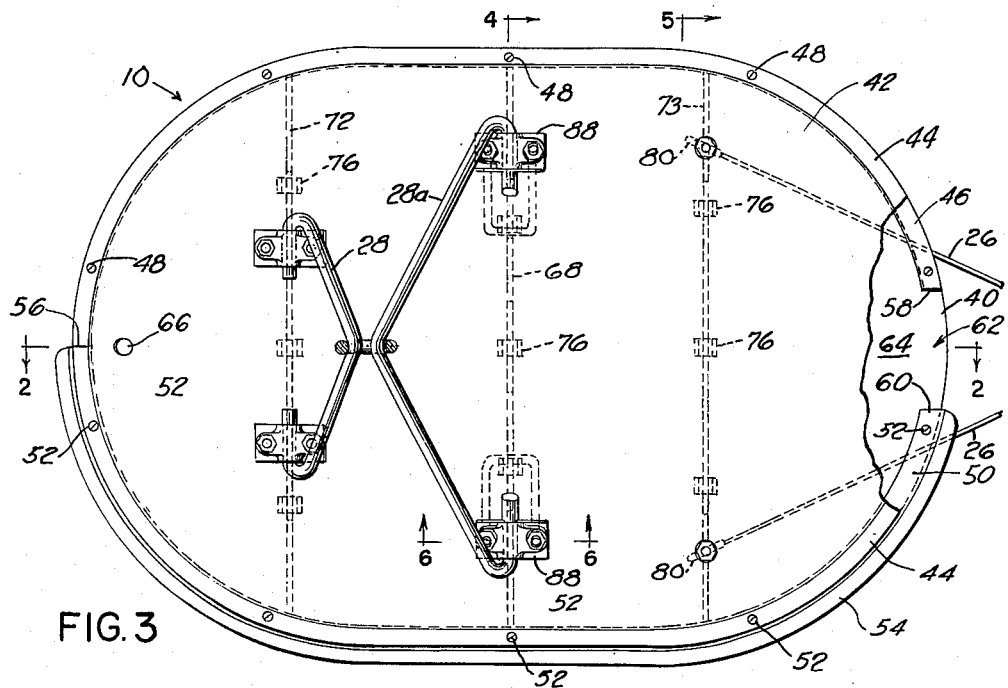
FIG. 3 is a plan view detail of the present trawl door.
Figures 4, 5, 6:
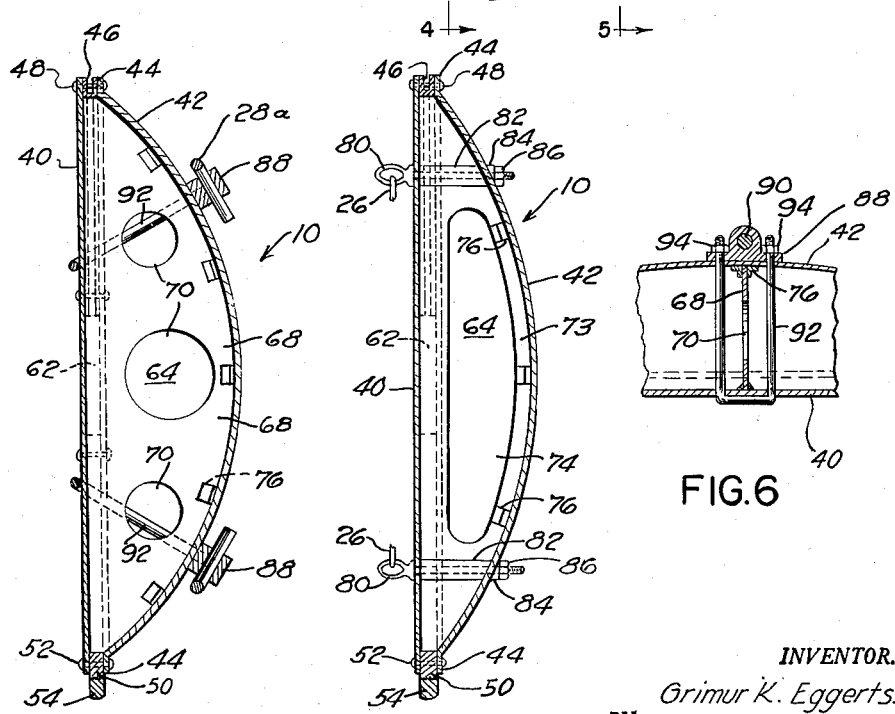

FIGS. 4 and 5 are vertical cross sectional views taken on the lines 4—4 and 5—5, respectively, of FIG. 3; and FIG. 6 is a horizontal section taken on the line 6—6 of FIG. 3.

In general the present invention contemplates novel and improved trawl doors for trawl fishing nets, the doors being herein illustrated as attached to the ground wires and towing warp wires of a trawl net, which are characterized by structure which lends stability to the doors and which permits the doors to be pulled through the water relatively easily during the towing operation, thereby requiring less power to effect the towing operation.

A conventional trawl net for catching bottom fish is usually provided with floats attached to the head rope thereof to keep the top of the net lifted; the foot rope of the trawl net is provided with weights which may be in the form of rollers to keep the bottom of the net down; and the door ends of the wings of the net are provided with trawl doors which slide standing on edge along the bottom of the sea while set at an angle to the direction of the tow so that their shearing forces tend to open the wings outwardly during the towing operation.

The prior trawl doors comprise flat rectangular structures usually made of metal or of wood bound with metal. Such prior trawl doors, because of their flat rectangular shape, offer great towing resistance and maximum power requirements because of the relatively flat face of the door and because of the suction created on the outer or rear faces of the doors being towed in an angular position. Also, such prior doors, because of their shape and structure, lack stability at certain towing speeds so that they may sometimes fail to maintain their angular edgewise position and may be dragged along the bottom in a flat position.

In accordance with the present invention a hollow "turtle-back" shaped trawl door is provided having openings to permit the entrance and discharge of water therefrom and which is adapted to maintain its stability at all towing speeds and offers less towing resistance and, consequently, requires less power to perform the towing operation.

Referring now to the drawings, and particularly to FIG. 1, the present improved trawl doors are indicated generally at 10 and are shown as connected by ground wires 12 to the wings of a conventional trawl net 14 designed to be towed along the bottom of the sea and to trap any fish in the path thereof. As herein shown, the head rope 16 may be provided with floats indicated generally at 18 arranged to keep the top of the net lifted, and the foot rope 20 may be provided with weighted rollers 21 to keep the bottom of the net down. In practice the ground wires 12 are connected at one end to the upper and lower legs of the trawl net wing bridle, one leg 22 of each bridle being connected to the foot rope at the door end of the wings, and the other leg 24 of each bridle being connected to the head rope at the door end of the wings. The ground wire 12 may be of considerable length, depending on the size of the net, and the other end of each ground wire 12 is connected to the trawl door back strap, as indicated at 26. The forward or leading end of each trawl door 10 is provided with trawl door brackets indicated at 28 and 28a which are connected by a chain 30 to the towing warp wires 32 leading to the towing vessel.

Referring now to FIGS. 2 and 3, the present trawl door 10 comprises a generally elongated oblong hollow sheet metal structure having rounded or semicircular ends, as shown in FIG. 3, one face of the structure being convex, as shown in FIG. 2, to form a "turtle back" shape. As herein shown, the hollow structure is defined by a flat sheet metal back plate 40 and a convex shaped sheet metal front plate 42 having a flange portion 44. The flange portion 44 is connected to the marginal portion of the back plate 40 along the upper half of its periphery by an intervening channel member 46, see FIG. 4, to which the plates may be attached by bolts or rivets 48 as indicated, or alternatively, the front and back plates may be welded to the channel member 46. The structure thus defined provides a hollow chamber 64.

As shown in FIGS. 3 and 4, the lower portion of the periphery of the oblong structure is preferably connected by an intervening solid metal insert plate 50 which may also be connected to the flange 44 and the marginal portion of the back plate 40 by bolts or rivets as indicated at 52, or may be welded thereto. The metal insert 50 may extend a short distance beyond the periphery of the flange portion 44 and the back plate 40 to provide a surface to which a replaceable bottom rail or runner 54 may be welded. As shown in FIG. 3, the upper connecting channel member 46 extends from a point 56 halfway around the semicircular leading end of the structure, around the top of the door and terminating at a point 58 short of the halfway point around the semicircular trailing end of the door. Likewise, the solid metal insert 50 extends from an abutting relationship with the channel member 46 at the leading end of the door, around the bottom of the door and then upwardly around the trailing end and terminating at a point 60 short of the halfway point. Thus, the space 62 between the terminating points 58, 60 provides an opening affording communication between the water and the interior of the chamber 64 at the trailing end of the hollow structure. The leading end of the structure is provided wtih a relatively small opening 66 in the convex front plate 42 also affording communication between the water and the interior of the chamber 64.

As illustrated in FIG. 2, the hollow chamber 64 is provided with three equidistantly spaced and transversely extended metal reinforcing plates including a central plate 68 having spaced openings 70 therein, as also shown in FIG. 4, and end plates 72, 73, each having an elongated opening 74 therein, thus affording communication between the various compartments of the chamber formed by the reinforcing plates.

In assembling the door, the reinforcing plates 68, 72, 73 may be welded along their straight edges at right angles to the back plate 40 prior to assembly with the convex front plate 42, and the latter may be provided with spaced angle members 76 on the inner face thereof into which the curved edges of the reinforcing plates are inserted to retain the parts in operative relation while the marginal edges are secured to the intervening upper and lower connecting members 46 and 50.

The two legs of the trawl door back strap 26 are connected to spaced eye bolts 80 which are extended through the back face 40 of the door. As herein illustrated, each eye bolt 80 preferably extends through spaced bosses 82 formed in the rear reinforcing plate 73 as illustrated in detail in FIG. 5. The threaded end of each bolt 80 extends through the convex front plate 42 which may be provided with a small boss 84, and the bolt is provided with a nut 86. It will thus be seen that when the eye bolts 80 are tightened the front plate 42 is secured to the back plate 40 and the reinforcing plate 73 is clamped between the plates.

The trawl door brackets 28 and 28a are connected at their ends to bracket fittings 88 which are connected adjacent their respective reinforcing plates 68, 72 in a manner such as to clamp the reinforcing plates between the front and back door plates 40, 42. As shown in detail in FIG. 6, each bracket fitting 88 comprises a flanged bearing having an opening 90 into which the ends of the brackets are pivotally received. Each fitting is provided with spaced openings arranged to receive the legs of a U-bolt 92 which is extended through openings in the back plate 40. The threaded ends of the legs are provided with nuts 94 for securing the fittings to the front plate 42 as shown. As seen in FIG. 4, the U-bolt may extend angularly through the hollow structure.

As illustrated in FIG. 1, it will be seen that when the trawl doors are connected between the ground wires 12 and the towing wires 32, as shown, the doors are arranged with their convex or turtle-back sides 42 facing inwardly and with the bottom runners 54 against the ground. The chamber 64 is filled with water by virtue of the openings 66 and 62 and the openings in the transverse reinforcing plates. Thus, the internal and external pressures are equalized so that the hollow structure will not collapse when subjected to the pressure of deep water. The transverse reinforcing plates 68, 72 and 73 also serve to resist collapse of the structure in deep water.

In operation when the trawl doors are towed through the water, in the manner shown in FIG. 1, the convex or turtle-back faces thereof, comprising the shearing faces, tend to maintain the doors in a stable upright position by virtue of the wedging action provided by the progressively increasing thickness of the leading end of the turtle-back structure and the progressively decreasing thickness at the trailing end from a maximum intermediate the ends and also by virtue of the progressively decreasing thickness from the longitudinal center to the upper and lower portions of the convex shaped front face.

Thus, in operation the shearing forces are spread out or distributed over the convex surfaces in a manner such as to reduce the frictional drag and turbulence to a minimum as the door is towed through the water. Also, the shearing action against the upper and lower portions of the convex face of the doors is equalized tending to stabilize the movement of the door and to maintain it in an upright position. Thus, in practice the turtle-back contour of the door operates to displace the water in a manner such that the water flows smoothly and freely and with minimum friction over the convex surface whereby the power required to tow the door through the water is reduced to a minimum.

The transverse reinforcing plates also provide a retarding and stabilizing effect to maintain the door upright. Also, in practice the water in the chamber 64 may escape through the rear opening 62 which tends to dissipate any suction on the rear face 40 of the structure whereby to further reduce the drag of the door through the water.

While the trawl doors have been described as being manufactured from sheet metal it will be understood that in some instances they may be made partly of wood and bound with metal, or the various elements making up the hollow structure may be cast metal. It will also be understood that the doors may be made in various sizes to suit the size and type of the trawl net with which they are used. While the doors may be made in various proportions, it was found in practice that efficient results are obtained with a door proportioned about 6 feet long, 4 feet wide and between 1 and 1½ feet thick at the center of the convex structure. Larger or smaller doors may have the same relative proportions in length, breadth and thickness.

It will be understood that as used in the specification and in the claims, the terms "front" and "back" define the pressure surface and suction surface, respectively, of the trawl doors. As illustrated in FIG. 1, when the doors 10 are connected between the wings on each side of the trawl net and the towing vessel they assume an outwardly directed angular position with relation to the direction of the tow and with the convex pressure surfaces facing inwardly whereby the shearing forces tend to open the wings outwardly during the towing operation.

Having thus described the invention, what is claimed is:

1. A trawl door for fishing nets which is arranged to stand on edge when towed through the water comprising an elongated hollow oblong shaped body member, said body member being defined by a flat suction surface and a convex shaped pressure surface, said body member being of greatest thickness adjacent the center of the door and progressively decreasing in thickness from the center to the edges of the door, said body member having openings therein for permiting the water to flow therethrough as the door is towed through the water, and means attached to the body member for connecting the door to a fishing net and to a fishing vessel.

2. A trawl door as defined in claim 1 wherein the body member is provided with a bottom runner for sliding engagement with the floor of the ocean.

3. For use with a fishing net a trawl door which is adapted to stand on edge when towed through the water comprising an elongated hollow oblong body member having symmetrically rounded and tapered leading and trailing ends, said body member being defined by a flat back plate and a convex shaped front plate, said plates forming a hollow chamber, said body member having openings in the leading and trailing ends thereof communicating with said hollow chamber and the water and through which the water may flow as the door is towed therethrough, and means attached to the body member for connection to the fishing net and for connection to the fishing vessel.

4. A trawl door for fish nets as defined in claim 3 which includes spaced transverse reinforcing plates, the solid portions of said reinforcing plates serving as deflectors for the water passing through the chamber to provide a retarding and stabilizing effect and to induce outward angular movements of the door having openings therein and extended in the hollow chamber between said back and front plates.

5. A trawl door for fishing nets as defined in claim 3 wherein said body member is provided with upper and lower intervening marginal spacing elements secured between the marginal portions of said back and front plates.

6. A trawl door for fishing nets as defined in claim 3 wherein said body member is provided with upper and lower intervening marginal spacing elements secured between the marginal portions of said front and back plates and wherein said lower spacing element is provided with a runner for sliding engagement with the floor of the ocean.

7. A trawl door for fishing nets as defined in claim 3 wherein a pair of doors connected one to each wing of a fishing net and to a towing vessel are directed angularly outward with respect to the direction of the tow and with the convex surfaces facing inwardly whereby to effect and maintain the wings of the net outwardly spread during the towing operation.

8. A trawl door as defined in claim 3 wherein a section through the body memebr in both a horizontal and vertical direction shows a flat outer face and a convex inner face.

9. A trawl door as defined in claim 3 wherein the connecting means includes a connection attached a short distance forwardly of a vertical transverse center line of the front plate for connection to the towing vessel, and a connection attached a short distance rearwardly of a vertical center line of the back plate for connection to the fishing net whereby to maintain the door in an outwardly directed angular position as the door is towed through the water.

10. A trawl door for fishing nets comprising an elongated hollow oblong shaped body member having a flat back plate defining the suction surface and a convex front plate defining the pressure surface and providing a chamber therebetween, said body member being of greatest thickness at the center of the door and progressively decreasing in thickness from the center to the edges of the door to provide a symmetrical structure, said body member having openings in the leading and trailing ends thereof for communication with the water and through which the water may flow as the door is towed therethrough, a plurality of equally spaced transverse reinforcing plates having openings therein and extended between said front and back plates, a bottom runner for sliding engagement with the floor of the ocean, and means attached to said front and rear plates intermediate the ends thereof for connection to the towing vessel and the fishing net respectively.

11. A trawl door as defined in claim 10 wherein the connection to the towing vessel extends from the front plate at a point between a medial position and the leading end of the door, and the connection to the fishing net extends from the back plate between the medial position and the trailing end of the door whereby the door is maintained in an outwardly directed angular position as the door is towed through the water.

12. A trawl door as defined in claim 12 wherein the transverse reinforcing plates include a medially disposed plate and the water flowing through the chamber and engaging the solid portions of said medially disposed reinforcing plate serves to retard and deflect the water passing therethrough in a manner such as to induce outward angular movement of the door.

13. A trawl door as defined in claim 12 wherein the symmetrically shaped convex portions of the leading end of the front pressure plate provides a wedging effect with a minimum of friction such as to balance and stabilize the door to maintain the same in an upright position, and the symmetrically shaped convex portions of the trailing end assume a substantially tangential relation to the direction of the tow when the door is positioned in an outwardly directed angular position whereby to permit a smooth and substantially friction free flow of the water over said trailing end.

References Cited in the file of this patent

UNITED STATES PATENTS

| 1,548,409 | De Boer et al. | Aug. 4, 1925 |
| 2,608,781 | Pierlot | Sept. 2, 1952 |

FOREIGN PATENTS

| 1,185,847 | France | Feb. 16, 1959 |

UNITED STATES PATENT OFFICE
CERTIFICATE OF CORRECTION

Patent No. 3,007,274                              November 7, 1961

Grimur K. Eggertsson

It is hereby certified that error appears in the above numbered patent requiring correction and that the said Letters Patent should read as corrected below.

Column 4, lines 53 to 57, strike out "the solid portions of said reinforcing plates serving as deflectors for the water passing through the chamber to provide a retarding and stabilizing effect and to induce outward angular movements of the door", and insert same after "plates" in line 59, same column 4; column 6, line 8, for the claim reference numeral "12" read -- 11 --.

Signed and sealed this 12th day of June 1962.

(SEAL)
Attest:

ERNEST W. SWIDER                            DAVID L. LADD
Attesting Officer                                Commissioner of Patents